Jan. 9, 1940.   H. PELPHREY   2,186,269
MECHANISM FOR LUBRICATING WORM GEARS
Filed July 11, 1935   2 Sheets-Sheet 1

INVENTOR.
Harry Pelphrey.
BY
Harness, Dickey, Pierce & Haun.
ATTORNEYS.

Jan. 9, 1940.  H. PELPHREY  2,186,269
MECHANISM FOR LUBRICATING WORM GEARS
Filed July 11, 1935  2 Sheets-Sheet 2
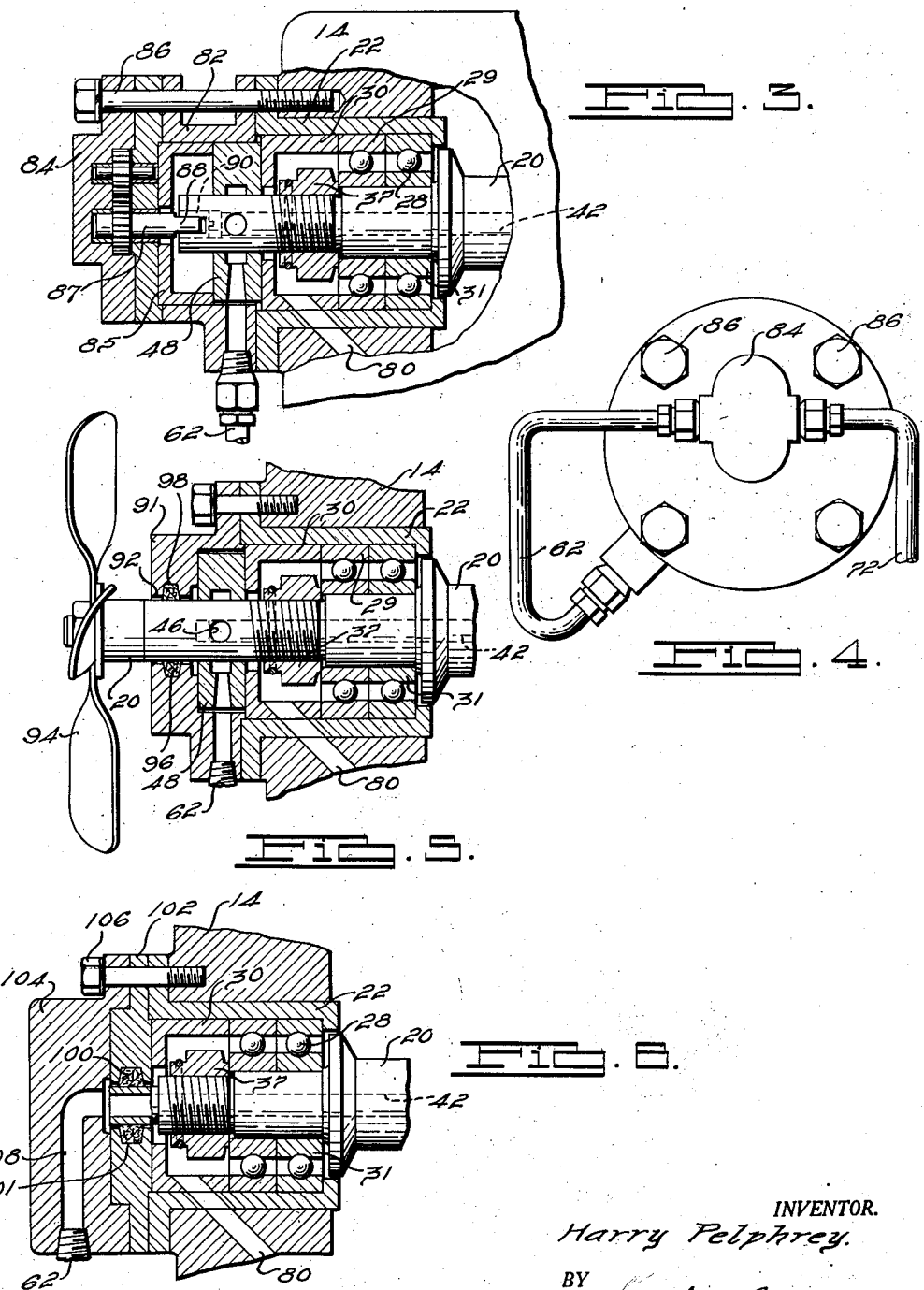
INVENTOR.
Harry Pelphrey.
BY
ATTORNEYS.

Patented Jan. 9, 1940

2,186,269

UNITED STATES PATENT OFFICE 2,186,269

MECHANISM FOR LUBRICATING WORM GEARS

Harry Pelphrey, Detroit, Mich.

Application July 11, 1935, Serial No. 30,817

3 Claims. (Cl. 184—6)

The present invention relates to lubricating mechanism for gear units, and more particularly to an arrangement in which the lubricant may be introduced axially of a gear.

It is an object of the present invention to provide a method of lubricating worm or other gears in which the lubricant is supplied to the gear teeth through the gear shaft.

It is also an object of the present invention to provide a method of lubricating gears of the above type, in which the lubricant is fed to the gear shaft through a peripheral opening in the latter.

It is also an object of the present invention to provide a gear unit embodying means to lubricate one or more of the gears through the shaft thereof.

It is also an object of the present invention to provide a gear unit embodying lubricating means in which lubricant, fed to a gear through the associated shaft, is introduced into the shaft through one or more peripheral openings therein.

It is also an object of the present invention to provide a gear construction embodying means to introduce gear lubricant to the gear teeth at the root line of the teeth.

It is also an object of the present invention to provide a lubricating device for worm or other gears of the force feed type and embodying a pump which may be driven either independently or in response to the gear unit.

It is also an object of the present invention to provide, for use in a gear unit, an improved construction of bearing retainers.

Other objects and advantages of the present invention appear in the following description or in the appended claims.

In the drawings, throughout which corresponding reference characters are used to designate corresponding parts:

Fig. 3 is a view in side elevation, partly in section, of a modification of the present invention;

Fig. 4 is a view in end elevation of the embodiment shown in Fig. 3;

Fig. 5 is a view in vertical section of a second modification of the present invention;

Fig. 6 is a view in vertical section of a third modification of the present invention.

In accordance with the present invention, lubricant is supplied to a worm gear unit through the worm gear shaft and passes to the worm gear teeth through an opening or openings formed near the teeth roots. In accordance with the preferred embodiment, the lubricant is fed to the worm gear shaft through one or more peripheral openings therein, which may be located at any convenient shaft distance from the worm gear, thus permitting the shaft length to be independent of the lubricating mechanism. In practice, this feature is important in that it permits the shaft to be extended beyond the point at which the lubricant is introduced, to cooperate with any additional mechanism desired. In accordance with a modified embodiment, the lubricant is introduced at the end of the shaft.

In accordance with the present invention, further, the lubricant is fed to a collar, within which the worm gear shaft rotates. Preferably, and as illustrated, this collar is somewhat loosely mounted with respect to the associated housing or enclosure, so that minor misalignments of the shaft with respect to the housing do not interfere with the lubricating action.

The lubricant is preferably supplied to the worm gear under pressure, and the supply mechanism may be driven either independently or in response to the gear system. In acccordance with one illustrated embodiment, an oil pump is connected on the shaft of a worm which is an element of the worm gearing to be lubricated. In accordance with another modification, the oil pump is driven directly from the worm gear shaft of the unit.

Figure 1:
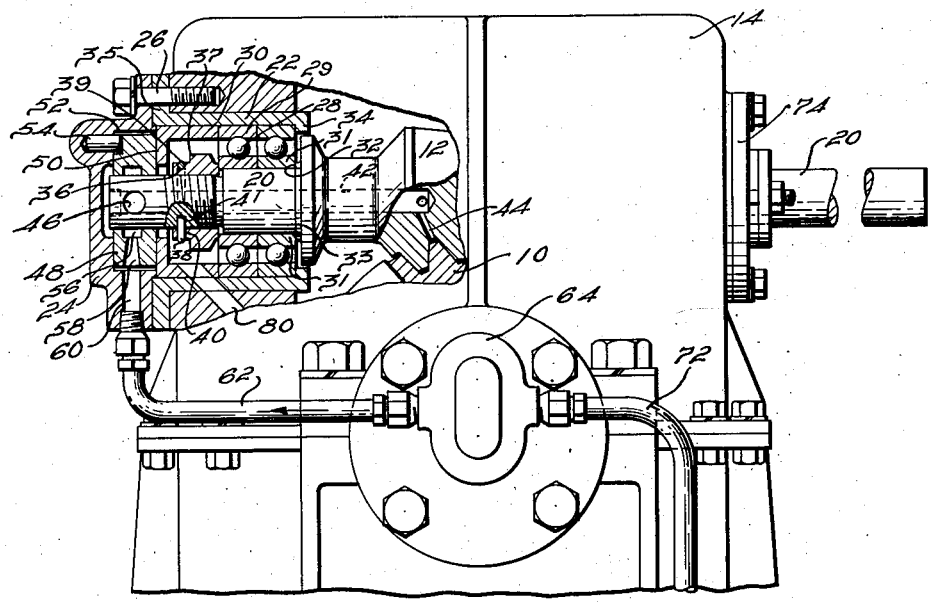
Figure 1 is a view in side elevation, with certain of the parts broken away, of an illustrative embodiment of the present invention.
Figure 2:
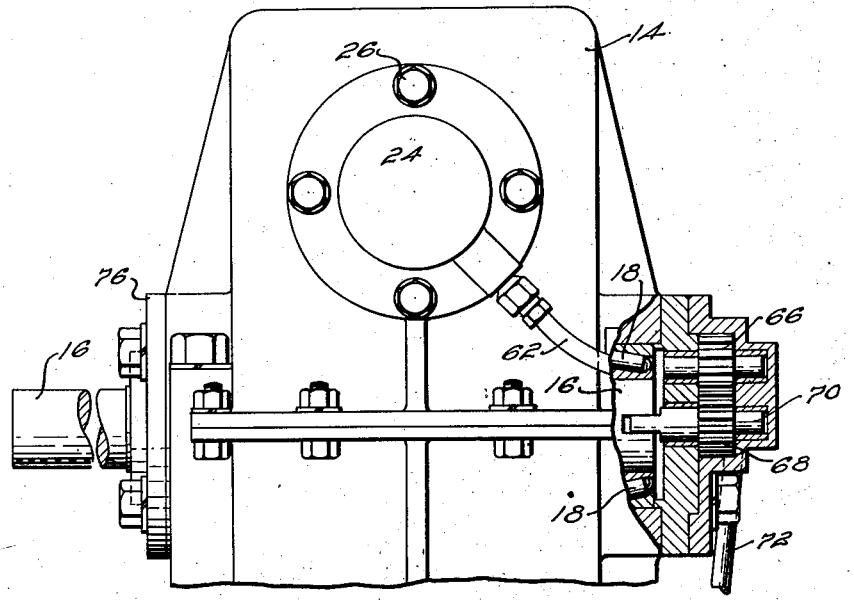
Fig. 2 is a view in end elevation, with certain of the parts broken away, of the embodiment shown in Fig. 1.

Referring to Figs. 1 and 2, an illustrative embodiment of the present invention comprises worm wheel 10, worm gear 12, which intermeshes with wheel 10, and a suitable housing 14 therefor. Worm wheel 10 is suitably secured in any desired manner (not shown) to a shaft 16, supported on roller bearings 18 within housing 14. Worm gear 12 may be either formed integrally with or suitably secured upon a shaft 20 journalled in housing 14.

As shown in detail in Fig. 1, a preferred bearing construction for one end of the shaft 20 comprises the sleeve 22, end bell 24, the ball bearing unit 28, the retaining cup 30 and the bearing retainer 37.

Sleeve 22 is cylindrical and is provided with an inturned end section 34 and an out-turned end section 35. Sleeve 22 is slidably received in housing 14 and is secured therein by studs 26 which also serve to secure end bell 24 in place The ball bearing unit 28 is slidably fitted within sleeve 22, one end of the outer ring 29 thereof bearing against the section 34. The other end of ring 29 of ball bearing unit 28 seats against the end of sleeve 30, slidably fitted in sleeve 22 and held in place by end bell 24. As will be understood, sleeves 22 and 30 and the outer ring 29 of the ball bearing unit 28 are stationary.

The inner ring 31 of ball bearing unit 28 is rather tightly fitted on the enlarged section 33 of shaft 20, and one end thereof abuts against the shoulder 32 formed on shaft 20. The other end of inner ring 31 abuts against the bearing retainer 37.

Retainer 37 is preferably threaded upon shaft 20 to a position in which it abuts against one end of ring 31, as mentioned, and is locked in place with respect to shaft 20 by clip ring 39, which partially surrounds retainer 37 and is received in the annular recess 36 formed therein. The normal size of retainer 37 is such that, when positioned within recess 36, it is sprung outwardly somewhat.

One end 38 of clip 39 is bent inwardly and passes through an opening 40 in retainer 37 and enters an opening 41 which extends partially through shaft 20, but not far enough to interfere with the lubricant passage 42, described below. It will be understood accordingly that clip 39 functions substantially as a conventional cotter pin.

In accordance with the present invention, worm gear 12 and worm wheel 10 are lubricated by introducing the lubricant axially of shaft 20. To provide this, shaft 20 is hollowed out to provide the axial opening 42 and worm gear 12 is provided with one or more ports 44 which extend from the root line and connect with opening 42. One or more openings 46 are formed around the periphery of shaft 20 and connect with passage 42.

Collar 48, which is fitted over the end of shaft 20 abuts against the inturned end 50 of stud 30, and is received within an annular recess 52 formed in the end bell 24. The recess 52 is sufficiently large to permit a limited amount of radial movement of collar 48 with respect to the housing and to permit a correspondingly limited amount of longitudinal movement thereof. A key 54 is provided to prevent rotation between collar 48 and housing 14. Collar 48 is provided with an interior chamber 56 which communicates with the exterior thereof through a port 58. Port 58 registers with a corresponding port 60 formed in end bell 24 and from which a conduit 62 leads to a suitable oil pump 64.

Oil pump 64 is illustrated as being mounted in driving relation to shaft 16 and, while it may be of any conventional type, has been illustrated as of the gear type, comprising the two intermeshing gears 66 and 68. Gears 66 and 68 are suitably journaled within the pump housing, and gear 68 is connected through shaft 70 to shaft 16. Pump structures of this character are conventional, and it will be understood that rotation of the gears draws fluid from the inlet side, illustrated as connected to conduit 72, through the pump, and discharges it through the outlet conduit 62. It will be understood that conduit 72 leads to a suitable source of oil supply.

The bearing designated generally 74 for shaft 20 is also preferably of the roller bearing type, the details not being illustrated in order to simplify the drawings. Similarly, the bearing designated generally 76 for worm wheel shaft 16 is preferably of the roller bearing type, the details being omitted from the drawings.

With reference to the operation of the unit as a whole, it will be understood that rotation of either gear 10 or 12 causes rotation of the other and is accompanied by rotation of the gears 66 and 68 of gear pump 64. This latter rotation forces lubricant through conduit 62 and into chamber 56 of collar 48. The lubricant passes from chamber 56 through openings 46 into the passage 42 formed in shaft 20 and from there passes through port 44 to the gear teeth. As previously mentioned, collar 48 is somewhat loosely supported with respect to the bearing structure to permit it to follow any irregularities of movement of shaft 20, and a limited amount of the lubricant may escape as a result of such looseness. As will be evident, however, any lubricant thus escaping is either retained within end bell 24 or passes over into the interior of sleeve 30, from which it is drawn off through the drain port 80. It has been found in practice that the required looseness of mounting of collar 48 may be provided without materially reducing the oil pressure developed within the chamber 56.

Referring to Figs. 3 and 4, a modification is illustrated in which the oil pump is connected to the shaft through which the lubricant is supplied. In the practice of this modification, the general assembly may be as described in connection with Figs. 1 and 2, and, accordingly, Figs. 3 and 4 illustrate only the oil pump and oil intake element.

As shown in Figs. 3 and 4, sleeve 22, retainer 37, sleeve 30 and ball bearing unit 28 afford a bearing for shaft 20 within housing 14 in the manner described in connection with Figs. 1 and 2. Similarly, oil is introduced to the passage 42, formed in shaft 20, through line 62 and collar 48 in the manner described in connection with Figs. 1 and 2. In this instance, collar 48 is supported between the previously described sleeve 30, a sleeve 82, and the cuplike member 85 which is slidably received within sleeve 82.

Gear pump 84, which may be of the same construction as described in connection with Figs. 1 and 2, is supported on the housing 14 by bolts 86 which also pass through and form a support for sleeve 82. The shaft 87 of pump 84 passes through an opening formed in member 85 and terminates in a boss 88 which enters a cooperating slot 90 formed in the end of shaft 20 to provide a driving connection between pump 84 and shaft 20. In all other respects, the construction and operation of the modification shown in Figs. 3 and 4 may be as described in connection with Figs. 1 and 2.

The construction shown in Fig. 5 is illustrative of embodiments of the present invention in which the shaft extends beyond the point at which the lubricant is introduced, for the purpose of connection to additional mechanism. In Fig. 5 all of the elements with the exception of end bell 91, are preferably as described in connection with Figs. 1 and 2. End bell 91 is provided with a central opening 92, through which shaft 20 extends. Any desired mechanism, of which fan 94 is illustrative, may be connected to the extended parts of shaft 20. In accordance with the preferred and illustrated construction, the bearing between the extension of shaft 20 and end bell 91 includes the packing gland 96, suitably supported in the recess 98 formed in end bell 91.

The modification shown in Fig. 6 is arranged so that the lubricant is introduced into the shaft at the end thereof. Referring to Fig. 6, the arrangement is preferably as described in connection with Figs. 1 and 2 with the principal exception that collar 48 is eliminated, and the opening 42 in shaft 20 is extended to the ends thereof, the peripheral openings 46 of Fig. 1 being eliminated. A packing gland 100 is preferably provided near the end of shaft 20, and is supported within a recess 101 in member 102. End bell 104, secured to housing 14 by bolts 106, is cored out to provide the lubricant conduit 108. The remaining details of the construction and the operation of the present modification may be as described in connection with Figs. 1 and 2.

Although specific embodiments of the present invention have been described, it will be evident that various changes may be made in the form, number and arrangement of parts without departing from the spirit and scope thereof. The described embodiments accordingly are to be considered in an illustrative and not a limiting sense.

What is claimed is:

1. Gear mechanism comprising a gear and a shaft therefor, a support for said shaft, means defining a longitudinal opening in said shaft, means communicating said opening with the surface of said gear and with a point on the periphery of said shaft, means comprising a collar for engaging said shaft at said surface point for introducing lubricant into said opening through said collar, and means for mounting said collar for limited movement with respect to said shaft support.

2. Bearing mechanism comprising a gear and a shaft therefor, said shaft having a longitudinal opening in communication with a point on the periphery thereof and with the surface of said gear, bearing means associated with said shaft, a collar for engagement with said shaft at said peripheral point, means for supporting said collar for limited movement with respect to said bearing means, and means for introducing lubricant through said collar into said opening.

3. Gear mechanism comprising a gear and a shaft member therefor, a support member for said shaft, means defining a longitudinal opening in said shaft member, means communicating said opening with the surface of said gear and with a point on the periphery of said shaft member, means comprising a collar for engaging said shaft member at said surface point for introducing lubricant into said opening through said collar, and means for mounting said collar for limited movement with respect to one of said members.

HARRY PELPHREY.